United States Patent [19]

Moseman, Jr. et al.

[11] 4,052,902

[45] Oct. 11, 1977

[54] STATIC FRICTION FREE ALTIMETER

[75] Inventors: Paul W. Moseman, Jr.; Russell F. Hart, both of Davenport, Iowa

[73] Assignee: The Bendix Corporation, South Bend, Ind.

[21] Appl. No.: 755,277

[22] Filed: Dec. 29, 1976

[51] Int. Cl.² .................................................. G01L 7/12
[52] U.S. Cl. ..................................... 73/387; 73/432 A
[58] Field of Search ..................... 73/386, 387, 432 A, 73/496; 310/8.3, 8.1

[56] References Cited

U.S. PATENT DOCUMENTS 3,831,451  8/1974  Argentieri et al. ................ 73/432 A Primary Examiner—Donald O. Woodiel
Attorney, Agent, or Firm—Leo H. McCormick, Jr.; Ken C. Decker

[57] ABSTRACT

A piezoelectrical transducer for providing an altimeter with vibratory motion to attenuate the effect of static friction on the movement of a gear train responding to an altitude responsive aneroid.

7 Claims, 1 Drawing Figure

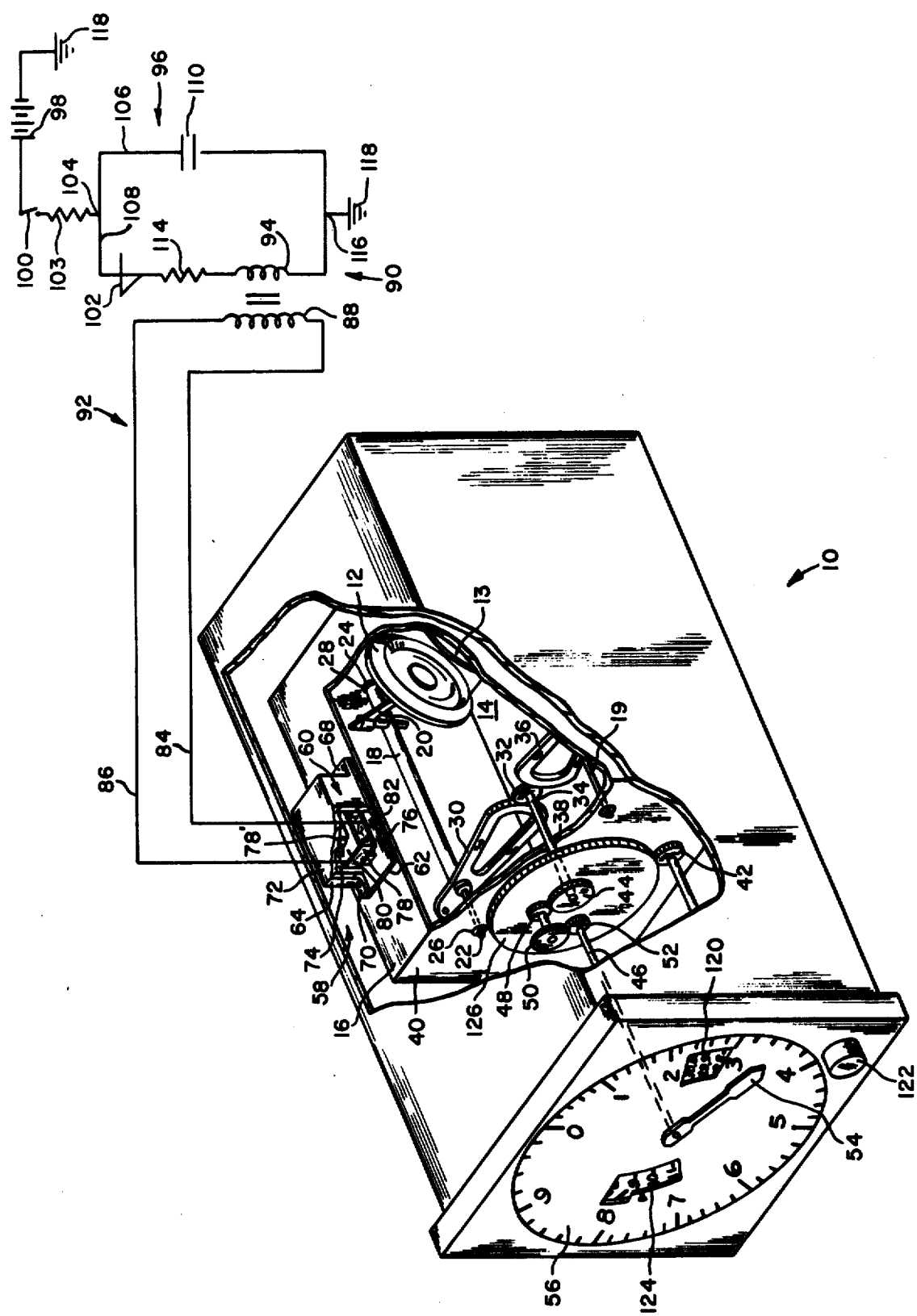

STATIC FRICTION FREE ALTIMETER

BACKGROUND OF THE INVENTION

This invention relates to a vibratory apparatus for attenuating static friction in an altimeter having an indicator driven by a low power sensor.

Since such low power sensors are responsive to the changes in pressure associated with changes in altitude, it is necessary that each increment of torgue developed by these sensors be transmitted to an output pointer without modification to assure that indicated altitude is the actual altitude.

Initially, it was thought that the vibrations produced within an aircraft would be sufficient to prevent static friction. However, from observation it was observed that the indicator pointer movement was erratic, especially when the aircraft was operating on a smooth glide path.

Thereafter, it was suggested that a rotating eccentric vibrator or electrically driven thumper be attached to the housing of the altimeter to attenuate static friction. While operating successfully to reduce static friction, such devices produce objectionable noise in the cockpit area of the aircraft, suffer from mechanical wearout, and thus fail to produce uniform results after a limited time period.

SUMMARY OF THE INVENTION

We have devised an altimeter with a piezoelectric transducer connected to the gear train of the altimeter which eliminates static friction without the creation of objectionable noise.

The piezoelectric transducer, which is located in a housing, is encapsulated in a layer of insulating material. The insulating material, in addition to preventing the transmission of electrical energy between the piezoelectric transducer and the housing, absorbs noise caused during the activation of the piezoelectric transducer by a cyclic electrical operational signal.

It is the object of this invention to provide an altimeter with a piezoelectric transducer connected to the gear train to attenuate static friction associated therewith.

It is a further object of this invention to provide an altimeter with a static friction reducer having a noise absorber through which a vibration force is transmitted to a gear train driven by a pressure responsive aneroid.

It is a still further object of this invention to provide an altimeter with a piezoelectric transducer responsive to an electrical signal derived from the operation of a four layer transistor diode device for attenuating static friction associated with a gear train through which a pressure responsive altitude sensor supplies an indicator with torque.

These and other objects should be apparent from reading this specification and viewing the drawing.

BRIEF DESCRIPTION OF THE DRAWING

The single FIGURE in the drawing schematically illustrates an altimeter and associated piezoelectrical transducer made according to the principles of this invention.

DETAILED DESCRIPTION OF THE INVENTION

The altimeter 10 shown in the drawing is similar to the altimeter disclosed in U.S. Pat. No. 3,916,185. The altimeter has a pressure responsive sensor with a first aneroid 12 and a second aneroid 13 located in a chamber 14 of a housing 16. The first aneroid 12 is connected to a shaft 18 through an arm 20. Ends 22 and 24 of shaft 18 are journalled in jeweled bearings 26 and 28 which are pressed into openings in housing 16.

A sector gear 30, which is fixed to shaft 18, engages gear 32 on the aneroid output shaft 34. The second aneroid 13 is similarly connected to a shaft 19 which retains sector gear 36. The output shaft 34 is carried through opening 38 in wall 40 of housing 16. A driver gear 44, which is fixed to the end of the output shaft 34, positions a barometric input gear 42 adjacent wall 40. The driver gear 44 is connected to output shaft 46 through reduction gears 48, 50 and 52. A pointer 54 attached to the end of shaft 46 is located over dial 56 to provide an operator with an indication of the altitude as measured by the aneroids 12 and 13.

A piezoelectrical transducer apparatus 58 which is attached to the housing 16 provides a controlled built-in vibration to compensate for static friction which can occur between the gears in the drive tain of the altimeter 10.

In more detail, the piezoelectrical transducer 58 has a metal housing 60. The metal housing 60 has a base 62 and sidewalls 64 and 66 which extend from the base 62. Tabs 68 and 70 radiate from the sidewalls 64 and 66 for engaging with a cover plate 72 to form a chamber 74 in the housing 60 for retaining a piezoelectrical crystal 76. The piezoelectrical crystal 76 is of a well known ceramic-type solution of lead-titanate and lead zirconate. A layer of thermosetting resin or other insulator material 78 is located between the piezoelectrical crystal 76 and the metal housing 60 to prevent electrical communication from the piezoelectric crystal 76 to an electrical ground. First and second metal contacts 80 and 82, which are located on opposite sides of the piezoelectrical crystal 76, are connected by lead lines 84 and 86, respectively, to the primary winding 88 of transformer 90 in a coupling circuit 92. The secondary winding 94 of the transformer 90 is located in an electrical supply circuit 96.

The electrical supply circuit 96 includes a source of electrical voltage 98 connected to actuation switch 100. A first resistor 103 is located between switch 100 and a junction 104. The junction 104 is connected to a capacitor 110 by a first lead 106 and to a transistor diode 102 by a second lead 108. The transistor diode 102 is a single crystal silicon having four layers of distinctly different states of electrical conduction. The transistor diode 102 has two stable states: (1) an "open" or high resistance state and (2) a "closed" or low resistance state. The transistor diode is switched from the first state to the second state by controlling the voltage across it and passing current through it. A resistor 114 is located between the transistor diode 102 and the secondary winding 94. The secondary winding 94 and the capacitor 110 are joined together at junction 116 and thereafter connected to electrical ground 118.

MODE OF THE INVENTION

The altimeter 10 is part of the equipment that a pilot of an aircraft must adjust and inspect as part of the preflight check out of the aircraft. Current barometric pressure must be obtained from control tower of an airport and fed into the altimeter 10 in order that the true ground elevation is displayed in window 124 while the aircraft is on the ground. The current barometric pressure is transmitted into the altimeter through knob 122 and displayed in window 120. Gear 126 which is connected to knob 122 rotates gear 38 on shaft 34 to supply a corrective torque to shaft 46 as gear 48 moves on stationary gear 44. This corrective torque causes the ground elevation indicated in window 124 to correspond to actual ground elevation of the airport.

Thereafter, when the aircraft is airborne, the expansion and contracion of the aneroids 12 and 13, in response to changes in pressure, create a linear force which is transmitted into the sector gears 30 and 36 through shafts 18 and 19. Movement of sector gears 30 and 36 cause gear 32 to rotate and provide gear 44 with a torque indicative of the change in the pressure associated with a change in altitude. The rotation of gear 44 is modified through reduction gears 48, 50 and 52 to provide shaft 46 with sufficient torque to position pointer 54 at the elevation corresponding to that computered by the aneroids 12 and 13.

When the aircraft is flying at a constant elevation, the entire gear train of the altimeter 10 from the aneroids 12 and 13 to the pointer 54 remains in a stationary position. Thereafter, with a change in elevation, the rotative torque required to move shaft 46 must overcome static friction before pointer 54 moves. Such static friction causes the pointer 54 to appear to jump from one elevation to another instead of following a linear relationship.

In order to avoid stop-jump movement of the pointer 54, switch 100 is activated by the pilot in the preflight check out. With switch 100 in the ON position, voltage from source 98 is communicated to junction 104. This voltage is simultaneously transmitted to the transistor diode 102 and the capacitor 110. During this time period, voltage is charging up the capacitor 110 and current flow through the transistor diode 102 is inhibited. When the voltage at the capacitor 110 reaches the breakover voltage of the transistor diode 102, the transistor diode 102 will switch to the closed or second operating condition. In this closed or second operating condition, the capacitor 110 is discharged to ground 118 as the current flows through resistor 114 and the secondary winding 94 of the transformer 90. When the current level of the capacitor 110 approaches a complete discharge, the transistor diode 102 reverts to the open or first operating condition and the charging up cycle begins again.

As the current flows through the secondary winding 94, a matching and amplified current signal is transmitted to the piezoelectrical crystal 76 through the coupling circuit 92. This amplified current signal causes the piezoelectrical crystal 76 to expand and exert a force through the insulator material 78 to housing 60.

The duration of the amplified current signal in the matching circuit 92 follows the time period that the transistor diode 102 is in the close condition. When the amlified current signal is removed from the piezoelectrical crystal 76, the expanded piezoelectrical crystal 76 reverts back to its original size.

The frequency of the amplified current signal in the matching circuit 92 is controlled by the charge-up time of capacitor 110 through resistor 103. A capacitor 110 is usually selected to control the output energy and frequency of the device.

By cyclicly applying the amlified current signal to the piezoelectrical crystal 76, the housing 60 sets up a vibratory force which is applied to housing 16 through base 62. This vibratory force is transmitted through housing 16 into shafts 34, 18 and 19. The vibratory force which reaches gear 32 is sufficient to prevent static friction in the entire gear train connected to pointer 54.

In addition, the insulation material 78 which surrounds the piezoelectric crystal 76 absorbs any noise created therein to prevent noise associated with the operation of the transducer apparatus 58 from being communicated into the cockpit of the aicraft.

We claim:

1. In an altimeter having a gear train driven by an altitiude responsive member, means for attenuating the frictional resistance of said gear train comprising:
    a housing connected to said gear train, said housing having a chamber located herein;
    a piezoelectrical transducer located in said chamber; and
    energy control means for supplying said piezoelectrical transducer with cyclic electrical signals, said cyclic electrical signals causing the physical dimensions of said piezoelectrical transducer to change and transmit vibratory motion through the housing to the gear train to eliminate the effect of static friction thereon.

2. The altimeter, as recited in claim 1, wherein said attenuating means further includes:
    insulator means for surrounding said piezoelectrical transducer, said insulator means isolating said piezoelectrical transducer to prevent the transmission of said cyclic electrical signals into said housing.

3. The altimeter, as recited in claim 2, wherein said insulator means completely encapsulates said piezoelectrial transducer and fills said chamber to modify the amplitude of said vibratory motion.

4. The altimeter, as recited in claim 1, wherein said energy control means includes:
    a source of voltage;
    shaping means connected to said voltage for storing a predetermined quantity of electrical charge in a fixed time period; and
    switch means responsive to said voltage and said predetermined quantity of electrical charge for allowing said predetermined quantity of electrical charge to be dissipated by flowing to an electrical ground and thereafter permit said shaping means to again store the predetermined quantity of electrical charge in said fixed time period.

5. The altimeter, as recited in claim 4, wherein said energy control means includes:
    coupling means located between said switch means and the electrical ground for deriving said cyclic electrical signal from the flow of said predetermined quantity of electrical current to the electrical ground.

6. The altimeter, as recited in claim 5, wherein said coupling means includes:
    a transformer with a primary winding located between said switch means and the electrical ground; and
    a secondary winding in series with the piezoelectrical transducer.

7. The altimeter, as recited in claim 6, wherein said energy control means includes:
    a resistor located between said switch means and said electrical ground to limit the flow of electrical current through said switch means.

* * * * *